US012448963B2

(12) United States Patent
Shchemelinin

(10) Patent No.: US 12,448,963 B2
(45) Date of Patent: Oct. 21, 2025

(54) ASYMMETRIC GAS BEARING BUSHING FOR THERMO-PUMP

(71) Applicant: KLA Corporation, Milpitas, CA (US)

(72) Inventor: Anatoly Shchemelinin, Bozeman, MT (US)

(73) Assignee: KLA Corporation, Milpitas, CA (US)

( * ) Notice: Subject to any disclaimer, the term of this patent is extended or adjusted under 35 U.S.C. 154(b) by 0 days.

(21) Appl. No.: 18/420,359

(22) Filed: Jan. 23, 2024

(65) Prior Publication Data

US 2024/0337259 A1 Oct. 10, 2024

Related U.S. Application Data

(60) Provisional application No. 63/457,104, filed on Apr. 4, 2023.

(51) Int. Cl.
F04B 53/00 (2006.01)
B23P 15/10 (2006.01)
(Continued)

(52) U.S. Cl.
CPC ............ *F04B 53/008* (2013.01); *B23P 15/10* (2013.01); *F02G 1/0435* (2013.01);
(Continued)

(58) Field of Classification Search
CPC .......... F16C 29/025; F16C 32/06–0625; B23P 15/10
See application file for complete search history.

(56) References Cited

U.S. PATENT DOCUMENTS 2,070,085 A * 2/1937 Long .................... F16J 1/06
92/236
4,802,774 A * 2/1989 Pesikov .............. F16C 32/0666
384/100
(Continued)

FOREIGN PATENT DOCUMENTS

DE 102011109176 A1 * 2/2013 ............. F02G 1/043
JP 2000104736 A 4/2000
(Continued)

OTHER PUBLICATIONS

Korean Intellectual Property Office, International Search Report and Written Opinion received in International Application No. PCT/US2024/021394, Jul. 11, 2024, 11 pages.
(Continued)

*Primary Examiner* — Laert Dounis
(74) *Attorney, Agent, or Firm* — Suiter Swantz IP

(57) ABSTRACT

A gas bearing is disclosed. The gas bearing may include a cylinder with an inner cylinder radius. The gas bearing may include a piston with a piston radius, wherein the inner cylinder radius is larger than the piston radius, wherein the piston is located within the cylinder. The gas bearing may include a gas bearing radius, wherein the gas bearing radius is greater than the piston radius and less than the inner cylinder radius. The gas bearing may include a gap that exists between the cylinder and the piston, wherein the gap contains a pressurized gas, the pressurized gas configured to prevent contact between the cylinder and the piston. The gas bearing may include a gas bearing interface, wherein the gas bearing interface is positioned to control a size of the gap.

31 Claims, 6 Drawing Sheets

(51) Int. Cl.
*F02G 1/043* (2006.01)
*F02G 1/053* (2006.01)
*F04B 39/12* (2006.01)
*F16C 29/02* (2006.01)
*F16C 32/06* (2006.01)

(52) U.S. Cl.
CPC .......... *F02G 1/0535* (2013.01); *F04B 39/126* (2013.01); *F16C 29/025* (2013.01); *F16C 32/0614* (2013.01); *F05C 2251/042* (2013.01)

(56) References Cited

U.S. PATENT DOCUMENTS

| | | | |
|---|---|---|---|
| 5,271,677 A | 12/1993 | Sherman et al. | |
| 6,016,738 A * | 1/2000 | Elferink | F04B 39/0005 |
| | | | 92/158 |
| 6,241,392 B1 * | 6/2001 | Desai | F16C 32/06 |
| | | | 384/114 |
| 6,379,125 B1 * | 4/2002 | Tojo | F04B 35/045 |
| | | | 417/417 |
| 6,506,030 B1 | 1/2003 | Kottke | |
| 11,450,521 B2 | 9/2022 | Shchemelinin | |
| 11,778,720 B2 | 10/2023 | Derstine et al. | |
| 2005/0172800 A1 * | 8/2005 | Uchino | F16C 29/025 |
| | | | 92/54 |
| 2006/0171822 A1 * | 8/2006 | Seagar | F04B 35/045 |
| | | | 417/258 |
| 2008/0008606 A1 * | 1/2008 | Muth | F04B 35/045 |
| | | | 417/398 |
| 2010/0046862 A1 * | 2/2010 | Schubert | F16C 29/025 |
| | | | 384/12 |
| 2010/0098356 A1 * | 4/2010 | Giacchi | F16C 29/025 |
| | | | 384/12 |
| 2010/0212311 A1 | 8/2010 | McQuary et al. | |
| 2024/0110549 A1 | 4/2024 | Shchemelinin | |

FOREIGN PATENT DOCUMENTS

| | | | | |
|---|---|---|---|---|
| KR | 20200091698 A * | 7/2020 | | |
| WO | WO-2009026104 A1 * | 2/2009 | .......... | F02G 1/0435 |

OTHER PUBLICATIONS

U.S. Appl. No. 18/368,242, filed Sep. 14, 2023, Shchemelinin.

* cited by examiner

ASYMMETRIC GAS BEARING BUSHING FOR THERMO-PUMP

CROSS-REFERENCE TO RELATED APPLICATION

The present application claims the benefit under 35 U.S.C. § 119 (e) of U.S. Provisional Application Ser. No. 63/457,104, filed Apr. 4, 2023, which is incorporated herein by reference in the entirety.

FIELD

This application relates to the use of gas bearings, and, more particularly, to gas bearings used for frictionless pump operation.

BACKGROUND

Gas bearings may provide frictionless operation of certain devices (e.g., thermo-pumps or thermo-compressors). However, the air gap of gas bearing may be subject to very tight tolerances. Therefore, slight variation of the air gap may result in non-ideal operation of the gas bearing. Further, traditional gas bearing interfaces (e.g., a V-shaped gas bearing) may be inoperable in environments where there is a high temperature gradient.

Gas bearings may have tight tolerance requirements for proper function. For example, in the case of a V-shaped gas bearing, different surfaces of the gas bearing may be required to have matching angles. This requirement may be problematic or introduce increased difficulty for the system. Further, at least one of surfaces of the V-shaped gas bearing should be aligned to the rest of the system. Typically, a self-aligning is used, when plates in the V-shaped gas bearing are mounted to the different surfaces with an adhesive (such as epoxy). However, this mounting may not be appropriate in situations when there are high temperatures in the thermal pump operation and/or cleanliness (e.g., low outgassing) requirements. There may therefore be a desire to eliminate the proceeding shortcomings of traditional gas bearings.

SUMMARY

A gas bearing is disclosed, in accordance with one or more embodiments of the present disclosure. In embodiments, the gas bearing includes a cylinder with an inner cylinder radius. In embodiments, the gas bearing includes a piston with a piston radius, wherein the inner cylinder radius is larger than the piston radius, wherein the piston is located within the cylinder. In embodiments, the gas bearing includes a gas bearing radius, wherein the gas bearing radius is greater than the piston radius and less than the inner cylinder radius. In embodiments, the gas bearing includes a gap that exists between the cylinder and the piston, wherein the gap contains a pressurized gas, the pressurized gas configured to prevent contact between the cylinder and the piston. In embodiments, the gas bearing includes a gas bearing interface, wherein the gas bearing interface is positioned to control a size of the gap.

A thermo-pump is disclosed, in accordance with embodiments of the present disclosure. In embodiments, the thermo-pump includes a sealed casing, wherein the sealed casing is divided into a main casing volume and one or more secondary volumes. In embodiments, the thermo-pump includes a shaft, wherein the shaft is configured to be driven to cause the shaft to linearly oscillate within the sealed casing. In embodiments, the thermo-pump includes a displacer, wherein the displacer is coupled to the shaft and oscillates within the main casing volume based on oscillation of the shaft, wherein oscillation of the displacer creates a pressure gain between a high-pressure phase and a low-pressure phase. In embodiments, the thermo-pump includes one or more displacer sealing rings, wherein the one or more sealing rings are coupled to the displacer and extend radially outward into the main casing volume, wherein the one or more sealing rings are made from a material selected to have at least one of a sealing ring thermal conductivity coefficient or a sealing ring thermal expansion coefficient below a threshold. In embodiments, the thermo-pump includes an insert, wherein the insert is configured to form a perimeter of the main casing volume, wherein the insert is made from an insert material selected to have at least one of an insert thermal conductivity coefficient or an insert thermal expansion coefficient below the threshold, wherein the one or more sealing rings and the insert direct a gas through the displacer. In embodiments, the thermo-pump includes one or more bushings, wherein the one or more bushing separate the sealed casing into the main casing volume and the one or more secondary volumes. In embodiments, the thermo-pump includes one or more gas bearings configured to prevent contact between the shaft and the sealed casing, wherein the one or more gas bearings are configured to operate based on the high-pressure phase and the low-pressure phase created by pressure oscillations caused by the oscillation of the displacer. In embodiments, the gas bearing includes a cylinder with an inner cylinder radius. In embodiments, the gas bearing includes a piston with a piston radius, wherein the inner cylinder radius is larger than the piston radius, wherein the piston is located within the cylinder. In embodiments, the gas bearing includes a gas bearing radius, wherein the gas bearing radius is greater than the piston radius and less than the inner cylinder radius. In embodiments, the gas bearing includes a gap that exists between the cylinder and the piston, wherein the gap contains a pressurized gas, the pressurized gas configured to prevent contact between the cylinder and the piston. In embodiments, the gas bearing includes a gas bearing interface, wherein the gas bearing interface is positioned to control a size of the gap.

A system is disclosed, in accordance with embodiments of the present disclosure. In embodiments, the system includes a broadband plasma light source. In embodiments, the system includes a thermo-pump configured to provide pressurized gas flow to a broadband plasma light source. In embodiments, the thermo-pump includes a sealed casing, wherein the sealed casing is divided into a main casing volume and one or more secondary volumes. In embodiments, the thermo-pump includes a shaft, wherein the shaft is configured to be driven to cause the shaft to linearly oscillate within the sealed casing. In embodiments, the thermo-pump includes a displacer, wherein the displacer is coupled to the shaft and oscillates within the main casing volume based on oscillation of the shaft, wherein oscillation of the displacer creates a pressure gain between a high-pressure phase and a low-pressure phase. In embodiments, the thermo-pump includes one or more sealing rings, wherein the one or more sealing rings are coupled to the displacer and extend radially outward into the main casing volume, wherein the one or more sealing rings are made from a sealing ring material selected to have at least one of a sealing ring thermal conductivity coefficient or a sealing ring thermal expansion coefficient below a threshold. In embodiments, the thermo-pump includes an insert, wherein the insert is configured to form a perimeter of the main casing volume, wherein the insert is made from an insert material selected to have at least one of an insert thermal conductivity coefficient or an insert thermal expansion coefficient below the threshold, wherein the one or more sealing rings and the insert direct a gas through the displacer. In embodiments, the thermo-pump includes one or more bushings, wherein the one or more bushing separates the sealed casing into the main casing volume and the one or more secondary volumes. In embodiments, the thermo-pump includes one or more gas bearings configured to prevent contact between the shaft and the sealed casing, wherein the one or more gas bearings are configured to operate based on the high-pressure phase and the low-pressure phase created by pressure oscillations caused by the oscillation of the displacer. In embodiments, the gas bearing includes a cylinder with an inner cylinder radius. In embodiments, the gas bearing includes a piston with a piston radius, wherein the inner cylinder radius is larger than the piston radius, wherein the piston is located within the cylinder. In embodiments, the gas bearing includes a gas bearing radius, wherein the gas bearing radius is greater than the piston radius and less than the inner cylinder radius. In embodiments, the gas bearing includes a gap that exists between the cylinder and the piston, wherein the gap contains a pressurized gas, the pressurized gas configured to prevent contact between the cylinder and the piston. In embodiments, the gas bearing includes a gas bearing interface, wherein the gas bearing interface is positioned to control a size of the gap.

A method is disclosed, in accordance with embodiments of the present disclosure. In embodiments, the method includes a step of making a piston with a piston radius and a cylinder with an inner cylinder radius, wherein the piston radius and the inner cylinder radius are equal. In embodiments, the method includes removing a portion of a surface of the piston to make the inner cylinder radius greater than the piston radius. In embodiments, the method includes positioning the piston within the cylinder, wherein the piston and cylinder are positioned such that there is a gap between the piston and the cylinder. In embodiments, the method includes supplying a pressurized gas to the gap, wherein the pressurized gas is configured to prevent contact between the cylinder and the piston; wherein a gas bearing interface is at a location where the size of the gap is at a minimum. In embodiments, the method includes preloading the gas bearing.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures.

DETAILED DESCRIPTION

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Gas bearings may be used in environments with high temperature gradients and/or cleanliness requirements. Therefore, it may be beneficial for a gas bearing made out of two cylindrical components. These components may be concentrically oriented. Further, a thin layer of pressurized gas may be between the two cylindrical components to prevent contact between the two cylindrical components. This configuration may provide a frictionless environment that is beneficial when compared to traditional bearings. Further, a gas bearing made from two cylindrical components may be better suited for environments with a high temperature gradient across the gas bearing.

Such a gas bearing may be used in conjunction with thermo-pumps. For example, the thermo-pumps may be used with a broadband plasma (BBP) light source. However, it should be noted that the gas bearing disclosed herein may be used in conjunction with any additional equipment.

In practice, the only non-planar gas bearing interface that may be manufactured as a single part is a cylindrical bearing. Therefore, manufacture of a cylindrical gas bearings may be beneficial because of a reduced number of parts.

Referring now to FIGS. 1-6, a gas bearing 100 made from two cylindrical components is disclosed, in accordance with one or more embodiments of the present disclosure.

Figure 1:
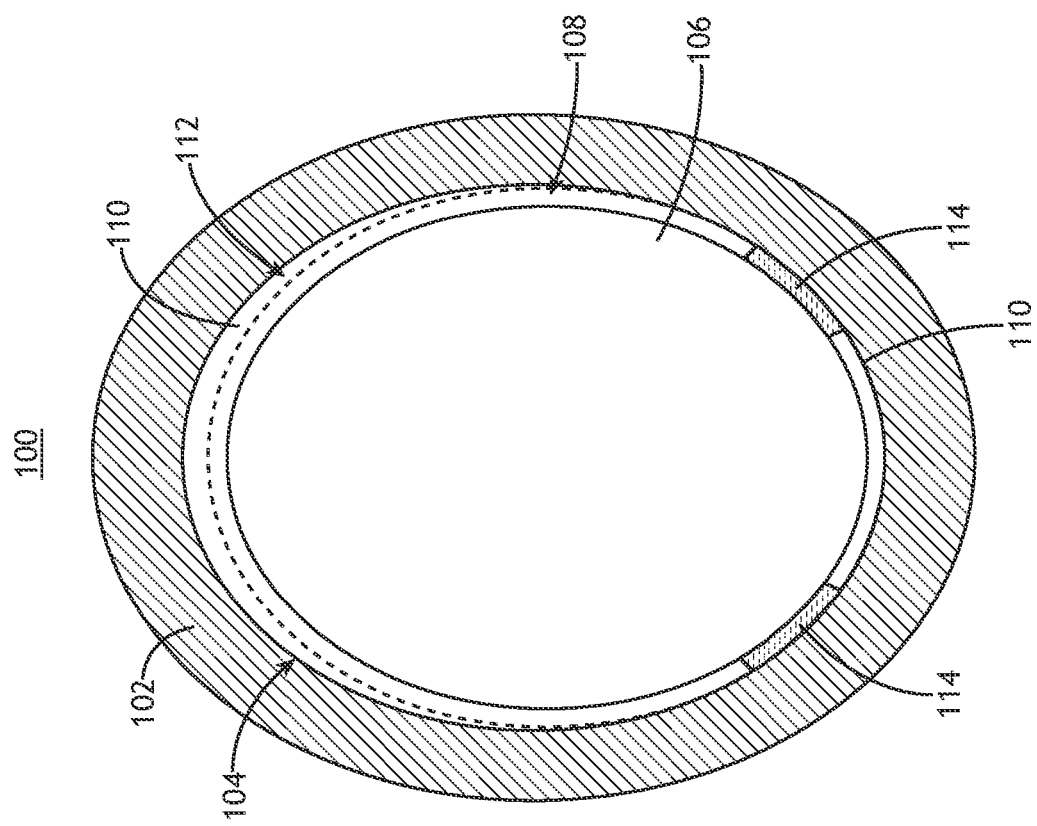
FIG. 1 illustrates cross-sectional view of a gas bearing, in accordance with one or more embodiments of the present disclosure.

FIG. 1 illustrates a cross-sectional view of a gas bearing 100, in accordance with one or more embodiments of the present disclosure. The gas bearing 100 may be created by using two cylindrical segments to form a single cylindrical gas bearing 100. It is noted that such a design may allow for practical manufacturing of the gas bearing 100. It should be noted that the segments that form the gas bearing 100 may be any shape, and are not strictly required to be cylindrical.

In embodiments, the gas bearing 100 includes a cylinder 102 with an inner cylinder radius 104. For example, the cylinder 102 may be formed as a tube or other hollow body. In this way, the inner cylinder radius is the radius 104 of the hollow space of the cylinder 102.

In embodiments, the gas bearing 100 includes a piston 106 with a piston radius 108. The piston 106 may be shaped like a rod. The inner cylinder radius 104 may be larger than the piston radius 108. Further, the piston 106 may be located within the cylinder 102 (e.g., the piston 106 and the cylinder 102 are positioned concentrically). The manufacturing tolerances of the gas bearing 100 may be looser than in conventional gas bearings, such that at least one of the diameters may have tolerances greater than 10-20 micrometers (e.g., the tolerances for the inner cylinder radius 104 and the piston radius 108 may be greater than 5 micrometers).

The piston 106 and the cylinder 102 may be manufactured such that they originally have the same radius. This operation may be precise and used to manufacture the gas bearing 100 (e.g., manufacture a cylindrical gas bearing 100). Subsequently, to achieve an inner cylinder radius 104 that is larger than the piston radius 108, a portion of the surface of the piston 106 may be machined to decrease the piston radius 108. This may be done because applications of the gas bearing 100 may not be particularly sensitive to the gap 110 between the piston 106 and the cylinder 102. For example, the practical gap 110 size to mitigate thermal expansion may be around 0.1 millimeters (e.g., the difference between the inner cylinder radius 104 and the piston radius 108 may be less than 0.1 millimeters). However, it should be noted that the size of the gap 110 may be dependent on specific applications of the gas bearing 100 and the materials used in manufacturing the gas bearing 100.

The piston 106 and the cylinder 102 may be made from the same material. In this way, the piston 106 and the cylinder 102 may be stable in response to temperature gradients across the gas bearing 100. However, the piston 106 and the cylinder 102 need not be made from the same material. For example, the piston and the cylinder may be made from different materials. However, in the case the piston 106 and the cylinder 102 are made from different materials it may be beneficial for the thermal expansion coefficients of the different materials to be the same (or approximately the same). In this way, issues resulting from temperature gradients may be mitigated. However, temperature difference between piston and cylinder is only partially compensated. As a nonlimiting example, the piston 106 and/or the cylinder 102 may be made from stainless steel.

In embodiments, the gas bearing 100 includes a gas bearing radius 112. The gas bearing radius 112 may be greater than the piston radius 108 and less than the inner cylinder radius 104. In this way, the gas bearing radius 112 may be positioned between the cylinder 102 and the piston 106.

In embodiments, the gas bearing 100 includes a gap 110. The gap 110 may exist between the cylinder 102 and the piston 106. The gap 110 may contain a pressurized gas (e.g., air, nitrogen, argon, or the like). The pressurized gas may be configured to prevent contact between the cylinder 102 and the piston 106. However, it should be noted that the gap 110 need not be consistent in the entirety of the air bearing 100 (e.g., the gap may be asymmetric). For example, the gap 110 between the cylinder 102 and the piston 106 may be larger on one side of the gas bearing 100 than on the other side of the gas bearing 100.

An asymmetric design of the gas bearing 100 may require pre-loading of the gas bearing 100 in order for the gas bearing 100 to operate effectively. The gas bearing 100 may be preloaded in a variety of ways. As one nonlimiting example, the gas bearing 100 may be preloaded using gravity (e.g., orienting the cylinder 102 horizontally or at an angle). As another nonlimiting example, the gas bearing 100 may be preloaded with springs (e.g., as in FIG. 4).

In embodiments, the gas bearing 100 includes a gas bearing interface 114. The gas bearing interface 114 may be positioned to control a size of the gap 110. For example, the gas bearing interface 114 may be located where the gap 110 is the smallest (e.g., where the cylinder 102 and the piston 106 are closest to one another).

Figure 2:
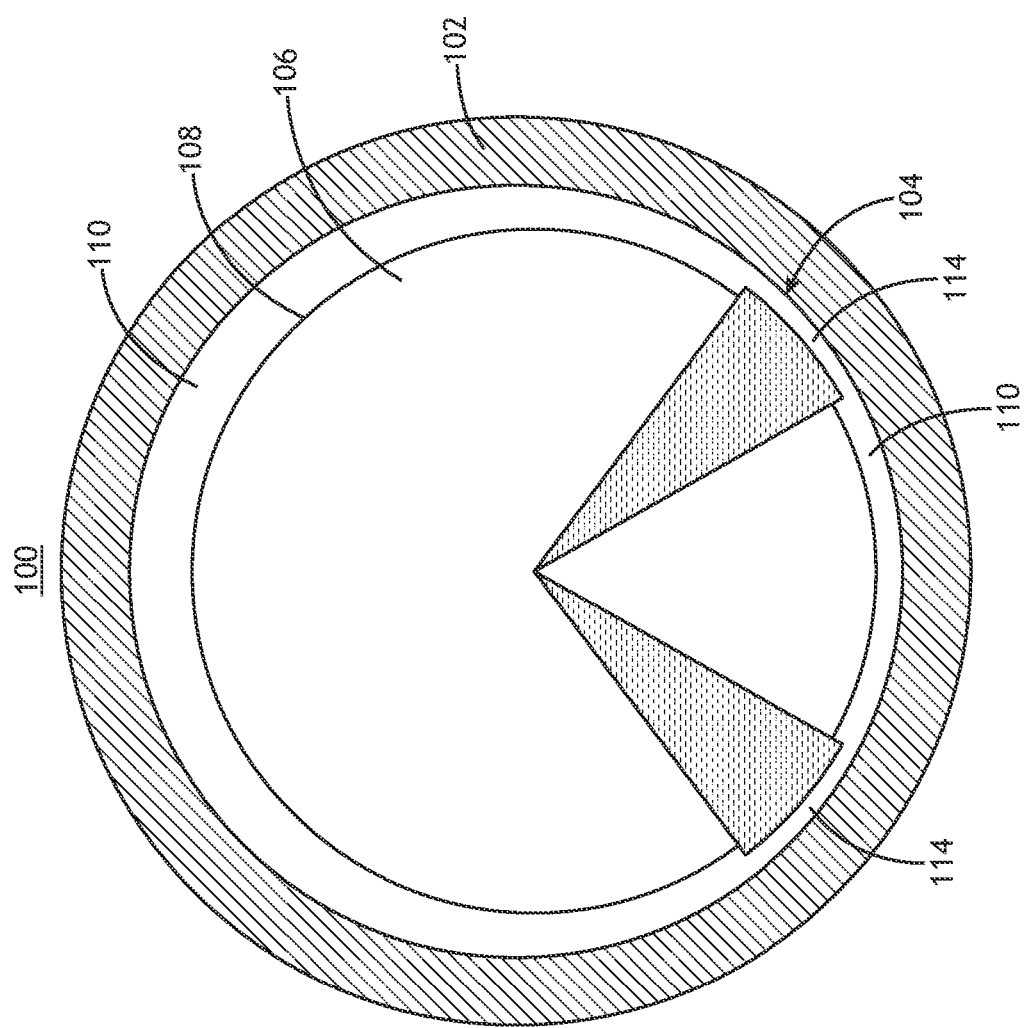
FIG. 2 illustrates a cross-sectional view of a gas bearing showing misalignment, in accordance with one or more embodiments of the present disclosure.

FIG. 2 illustrates a cross-sectional view of a gas bearing 100 showing misalignment, in accordance with one or more embodiments of the present disclosure.

The misalignment in FIG. 2 may be caused by thermal expansion differences in the gas bearing 100. The misalignment may be caused by different thermal expansion coefficients in the piston 106 and the cylinder 102. However, the effect of the misalignment may be less significant in the case of the gas bearing 100 of the present disclosure than other gas bearings. Therefore, the misalignment in FIG. 2 may be acceptable in some practical uses of the gas bearing 100 (e.g., in a thermo-pump). Further, the main part of the misalignment may be compensated by a vertical shift of the piston 106.

As a nonlimiting example, for a 100 millimeter diameter piston, practical materials (e.g., stainless steel) and practical temperature differences in the thermo-pump (e.g., approximately 200 degrees Celsius), the difference in diameter between the piston 106 and the cylinder 102 can be kept below 0.2 millimeters. In this case, the gap 110 may be less than 15 micrometers (e.g., a typical gas bearing 100 gap 110) over 30 millimeters of length, which may be sufficient for practical designs of the gas bearing 100.

For example, U.S. patent application Ser. No. 18/368,242, which is herein incorporated by reference in its entirety, discloses solution to enable keeping the difference in the piston radius 108 and the inner cylinder radius 104 less than 0.1 millimeters. Further, this application is related to U.S. Pat. No. 11,778,720 which is herein incorporated by reference in its entirety.

Figure 3:
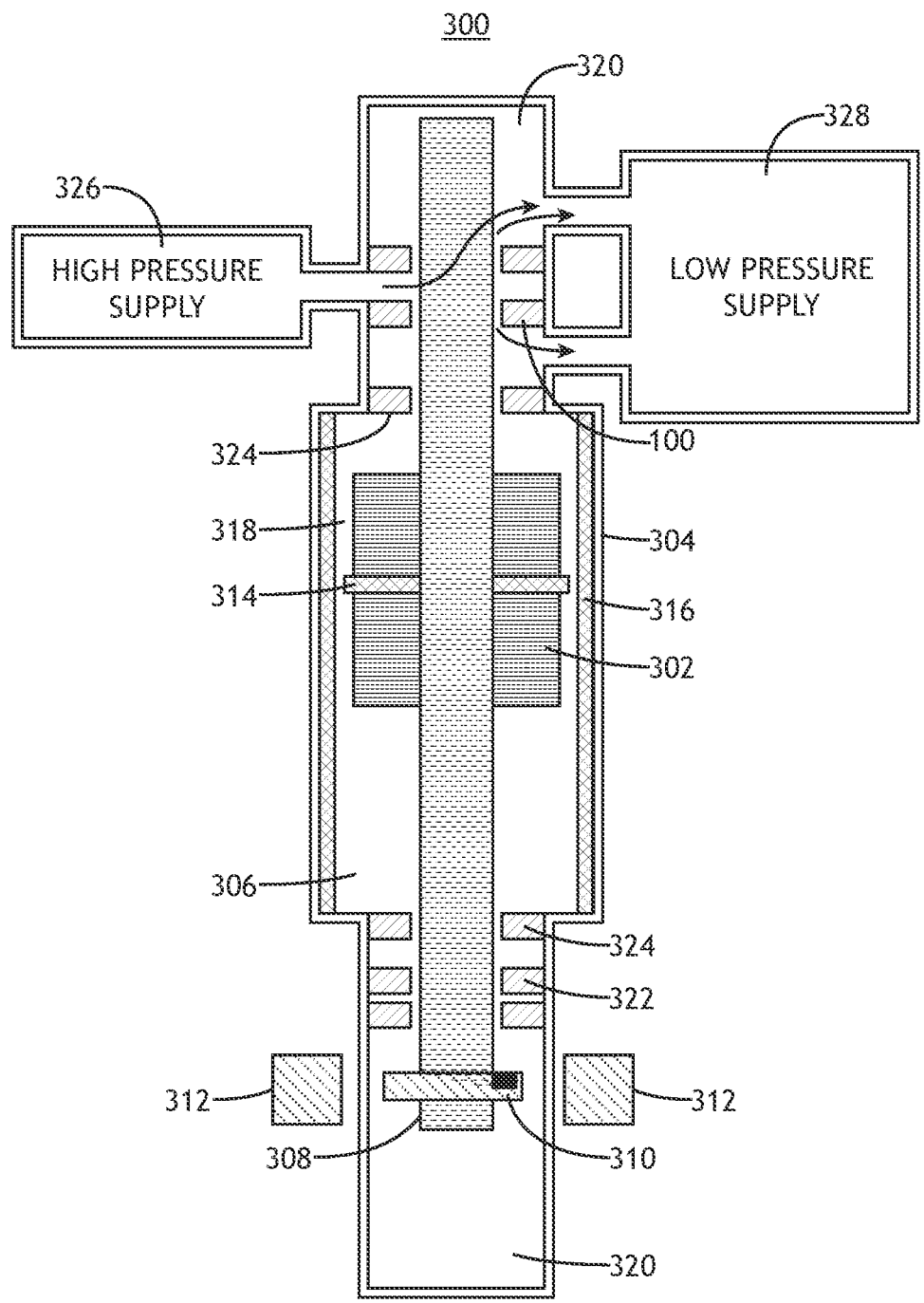
FIG. 3 illustrates a cross-sectional schematic view of a thermo-pump, in accordance with one or more embodiments of the present disclosure.

FIG. 3 illustrates a cross-sectional schematic view of a thermo-pump 300, in accordance with one or more embodiments of the present disclosure.

In embodiments, the thermo-pump 300 includes a displacer 302 within a sealed casing 304. The displacer 302 may be a body configured to move linearly (e.g., up and down) within the sealed casing 304. The displacer 302 may be designed to allow gas flow through it, for example by incorporating channels. The displacer 302 may further include one or more channels (e.g., vertical channels). For example, the channels may be designed to allow the flow of gases through the channel when the thermo-pump 300 is in operation (e.g., when the displacer 302 is oscillating). The displacer 302 may combine two functions: isolating gas in hot and cold ends of the sealed casing 304 and providing heat exchange with the gas passing through it. To meet these requirements, the displacer 302 is often made of several components, one of which may be a regenerator (not pictured) (e.g., a relatively small part that has high thermal conductivity and high thermal capacity and is placed at the core of the displacer 302), while the rest of the displacer 302 may be made from a lightweight material that displays low thermal conductivity and low thermal capacity. In embodiments, the regenerator may be made of multi-layered copper mesh. Further, the displacer 302 may be made from a material that has a high thermal expansion coefficient. Because the displacer 302 may have low thermal conductivity and capacity and has a high thermal expansion coefficient, the displacer 302 may exhibit relatively large thermal expansion during operation of the thermo-pump 300. As a nonlimiting example, the displacer 302 may be made from Teflon. In this way, the displacer 302 may include components with various thermal conductivities (e.g., the regenerator may have a high thermal capacity and the rest of the displacer 302 may have a low thermal capacity). It should be noted that for the purposes of the present application the displacer 302 will be referred to as a whole, instead of with reference to the individual components.

The displacer 302 may be configured to move a gas between hot and cold ends of the sealed casing 304. Moving the gas between the hot and cold ends of the sealed casing 304 may create a pressure gain between a high-pressure phase and a low-pressure phase.

In embodiments, the thermo-pump 300 includes a sealed casing 304. The sealed casing 304 may enclose a main casing volume 306, through which the displacer 302 linearly translates. The sealed casing 304 may have a significant temperature difference on either side of the sealed casing 304 (e.g., the top of the sealed casing 304 may be very cold and the bottom of the sealed casing 304 may be very hot, or vice versa). The large temperature difference between the two sides of the sealed casing 304 may cause significant thermal expansion. It should be noted that because the displacer 302 does not create a large pressure drop with its oscillations, only moderate sealing and driving forces are required within the thermo-pump 300.

In embodiments, the thermo-pump 300 includes a shaft 308. The displacer 302 may be coupled to the shaft 308, such that linear motion of the shaft 308 drives the displacer 302. Further, the shaft 308 may be configured to be driven such that the thermo-pump 300 may be maintained as a sealed system (e.g., the shaft 308 remains within the sealed casing 304 during operation of the thermo-pump 300). For example, the shaft 308 may be magnetically driven. In this way, the shaft 308 may have one or more magnets 310 coupled to it.

The magnets 310 may correspond to one or more magnetic drivers 312. The magnetic drivers 312 may be located outside the thermo-pump 300 (e.g., external to the sealed casing 304) and translate linearly. The magnets 310 coupled to the shaft 308 may be attracted to the magnetic drivers 312 in such a way that the shaft 308 is translated in a manner corresponding to the translation of the magnetic drivers 312. The magnetic drivers 312 may cause periodic motion of the shaft 308 (e.g., and thus, the coupled displacer 302). For example, the shaft 308 may oscillate once per second.

In embodiments, the thermo-pump 300 includes one or more sealing rings 314. Each sealing ring 314 may be directly coupled to the displacer 302. The sealing rings 314 may further extend radially outward through the main casing volume 306. The sealing rings 314 may be made from low-expansion materials (e.g., materials whose size is not affected by changes in temperature). Further, the sealing rings 314 may be made from materials that exhibit both low-expansion and low-conductivity properties. For example, the sealing rings 314 may be made from materials possessing a low sealing ring thermal conductivity coefficient and/or a low sealing ring thermal expansion coefficient, such as, but not limited to, glass, machinable glass (e.g., MACOR), ceramic, or the like. As an illustration, MACOR has a thermal conductivity of 1.46 W/(K*m), compared to 35 W/(K*m) for stainless steel. Thus, the flow of heat between the top of the main casing volume 306 and the bottom of the main casing volume 306 may be significantly reduced, along with the possibility of expansion of the sealing rings 314, when using materials such as machinable glass.

In this way, the sealing rings 314 may be manufactured with a diameter slightly less than the diameter of the main casing volume 306 because the diameter of the sealing rings 314 will not change significantly with changes in temperature (e.g., the sealing rings 314 can be almost the same size as the main casing volume 306 without making contact due to expansion). It should be noted that thermal expansion of the shaft 308 may be minimal due to the small diameter of the shaft.

The sealing rings 314 may be located at various locations on the displacer 302. For example, the sealing rings 314 may be placed such that they are on one or more sides of the displacer 302 (e.g., above the displacer 302 or below the displacer 302). By way of another example, the sealing rings 314 may be placed at locations along the displacer 302 (e.g., the displacer 302 is made of two or more discrete pieces with one or more sealing rings 314 in between). By way of another example, the sealing rings 314 may be placed at one or more ends of the displacer 302.

In embodiments, the thermo-pump 300 includes an insert 316. The insert 316 may be a hollow cylinder and may fit concentrically within the sealed casing 304 (e.g., the insert forms a perimeter of the main casing volume 306). In this way, the sealing rings 314 may be configured to be slightly smaller than the insert 316 (e.g., the sealing rings 314 may be slightly smaller than the insert 316 instead of being slightly smaller than the main casing volume 306). The insert 316 may be made from a material that possesses a low insert thermal conductivity coefficient and/or a low insert thermal expansion coefficient. For example, the insert 316 may be made from materials such as, but not limited to, glass, machinable glass (e.g., MACOR), ceramic, or the like (e.g., the insert 316 may be made from the same material as the sealing rings 314 or a different material than the sealing rings 314). It is noted that the use of such an insert 316 may be possible because of the lack of pressure differences between areas in the main casing volume 306.

The insert 316, in addition to the sealing rings 314, may result in a stabilized space 318 (e.g., a space 318 not susceptible to significant expansion and/or contraction of materials because low-expansion materials were used for both sides). Further, the insert 316, in addition to the sealing rings 314, may result in enhanced insultation of the thermo-pump 300. Because the insert 316 and sealing rings 314 may both be made from low-conductivity materials, heat flow between the high temperature and low temperature areas of the main casing volume 306 may be reduced, as well as preventing heat escaping the thermo-pump 300 through the sealed casing 304. In this way, the addition of the insert 316 and/or the sealing rings 314 may increase the efficiency and/or performance of the thermo-pump 300.

Further, the sealing rings 314 and the insert 316 may minimize a space 318 between the two. Thus, oscillating the displacer 302 and sealing rings 314 may force a gas to pass through the displacer 302 and exchange heat (e.g., the gas passes exclusively (or nearly exclusively) through the channels of the displacer 302 instead of flowing around the displacer 302). Further, the sealing rings 314 may isolate a hot end of the thermo-pump 300 from a cold end of the thermo-pump 300. The radial extension of the sealing rings 314 may compensate for the thermal expansion of the displacer 302 and other components of the thermo-pump 300 between a cold end of the main casing volume 306 and a hot end of the main casing volume.

The material used for the sealing rings 314 and/or the insert 316 may be selected so the thermal conductivity coefficient and/or the thermal expansion coefficient are below a threshold. For example, the threshold may be selected such that expansion of the sealing rings 314 and/or expansion of the insert 316 (e.g., expansion caused by temperature differences within the thermo-pump 300) do not result in contact with any solid surface (e.g., friction is prevented). Similarly, dimensions of the sealing rings 314 and/or the insert 316 may be selected based on the thermal conductivity coefficient and/or the thermal expansion coefficient to minimize expansion and maximize insulation of the thermo-pump 300.

The sealing rings 314 may be integrated (and a part of) displacer 302. In extreme case, the entire displacer 302 may have tight enough fit and won't require sealing rings 314.

Efficient operation of the thermo-pump 300 may be based on gas flowing through the channels of the displacer 302, and therefore through the regenerator (e.g., if the regenerator is made as a separate part), instead of around the displacer 302. Therefore, precise sealing rings 314 and/or inserts 316 may be used to minimize the space 318. For example, a small space 318 may result in nearly all of the gas in the main casing volume 306 flowing through the channels of the displacer 302, instead of around the displacer 302.

In embodiments, the thermo-pump 300 includes one or more secondary volumes 320 (e.g., the sealed casing 304 creates one or more secondary volumes 320 in addition to the main casing volume 306). For example, there may be a secondary volume 320 at the top of the thermo-pump 300 and a secondary volume 320 at the bottom of the thermo-pump 300. The secondary volumes 320 may be configured for the linear movement of the shaft 308, while the displacer 302 stays within the main casing volume 306.

In embodiments, the thermo-pump 300 includes one or more gas bearings 100. For example, each secondary volume 320 may include a gas bearing 100. The gas bearings 322 may be operated using the pressure gain generated by the thermo-pump 300.

In embodiments, the thermo-pump 300 includes one or more bushings 324. For example, each secondary volume 320 may be delineated from the main casing volume 306 by a bushing 324. The bushings 324 may form a tight fit with the casing 304 and/or the shaft 308. In this way, gases may be prevented from traveling between the main casing volume 306 and the secondary volumes 320. The bushings 324 may further divide (e.g., separate) the sealed casing 304 into the main casing volume 306 and the one or more secondary volumes 320.

In embodiments, the thermo-pump 300 includes a high-pressure supply 326 and a low-pressure supply 328. The pressures of the high-pressure supply 326 and the low-pressure supply 328 may be caused by the pressure gain caused by the thermo-pump 300. For example, the high-pressure supply 326 may be coupled to a high-pressure location of the thermo-pump 300, such as an output of the thermo-pump 300. By way of another example, the low-pressure supply 328 may be coupled to a low-pressure location of the thermo-pump 300, such as an input of the thermo-pump 300. High pressure gas may be supplied to the center of the gas bearing 100 (e.g., to form a thin layer of gas to prevent contact between the shaft 308 and the sealed casing 304).

It is noted that while the pressure in the main casing volume 306 varies between a high-pressure phase and a low pressure-pressure phase (e.g., the main casing volume 306 oscillates between a high-pressure phase and a low pressure-pressure phase), the pressure in the secondary volumes 320 may remain stabilized or constant (e.g., or nearly constant). The pressure in the secondary pressure volumes 320 may be kept constant because of the bushings 324. The bushings 324 may be configured such that they significantly reduce the flow of gases between the main casing volume 306 and the secondary volumes 320 (e.g., by reducing space for gases to flow between the main casing volume 306 and the secondary volumes 320 around the shaft). Because the secondary volume 320 has high pressure gas in it, the bushing 324 does not have to completely block the flow of gas between the main casing volume 306 and the secondary volumes 320. Instead, the bushings 324 only need to form a precise aperture, leaving a small space between the bushing 324 and the shaft 308 (e.g., to prevent friction between the shaft 308 and the bushing 324). Further, it is noted that the pressure drop may be up to the amount of pressure gain in the thermo-pump 300 and the gas flow may be significantly lower than the flow of the thermo-pump 300.

The gas bearings 100 may operate by producing a layer of a gas (e.g., high pressure gas) between two surfaces (e.g., the shaft 308 and the sealed casing 304). This layer of gas may prevent the two surfaces from making contract during linear translation of the shaft 308, such that the shaft 308 is able to operate in a frictionless environment (e.g., friction due to gas may be negligible below a certain speed threshold). Further, because there is no lubrication necessary (e.g., because there is no contact), the gas bearings 100 may be suitable for use in a clean environment. The bushings 324 may also result in stabilized pressures in the secondary volumes 320 (e.g., the volume in which the gas bearings 100 are located), which may make the gas bearings 100 suitable for operation in a high-pressure environment.

The high-pressure supply 326 and the low-pressure supply 328 may be used to operate the gas bearings 100 (e.g., the gas bearings 100 may operate on the pressure difference between input of the thermo-pump 300 and the output of the thermo-pump 300). The gas flow necessary for operation of the gas bearings 100 may be significantly less than the gas flow generated by the thermo-pump 300, and therefore, the gas bearings 100 may operate (e.g., produce a frictionless environment), while the thermo-pump 300 maintains its operational capabilities. The gas used within the thermo-pump 300 and for the gas bearings 100 may be any gas. For example, the gas may be argon (Ar).

Figure 4:
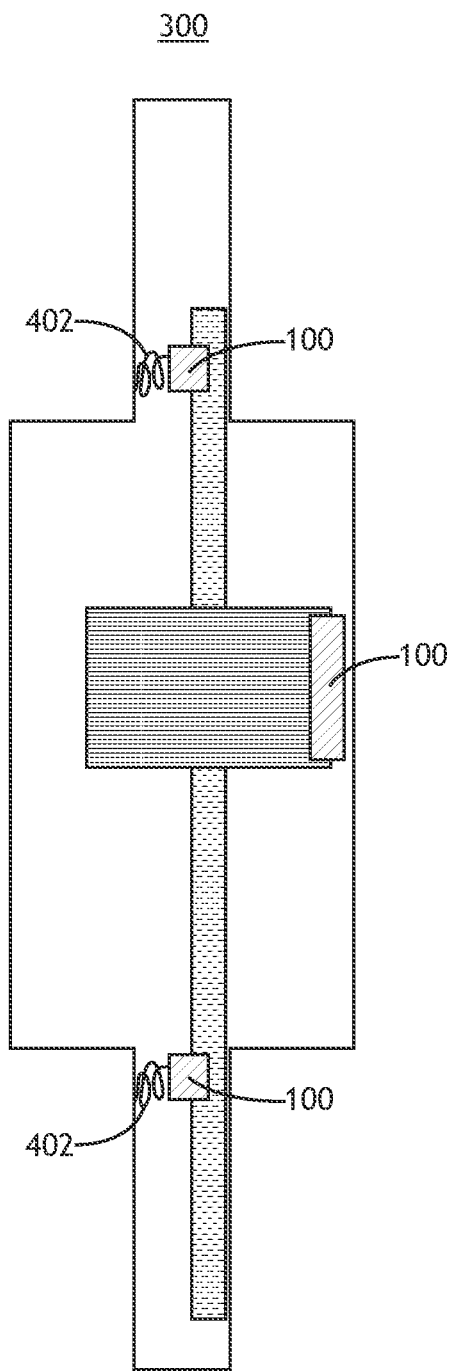
FIG. 4 illustrates a cross-sectional schematic view of the thermo-pump showing pre-loading using springs, in accordance with one or more embodiments of the present disclosure.

FIG. 4 illustrates a cross-sectional schematic view of the thermo-pump 300 showing pre-loading using springs 402, in accordance with one or more embodiments of the present disclosure.

Using springs 402 may have some advantages over using gravity to preload the gas bearings 100. For example, using springs 402 may allow the thermo-pump to be oriented vertically instead of horizontally while preloading the gas bearings 100.

Figure 5:
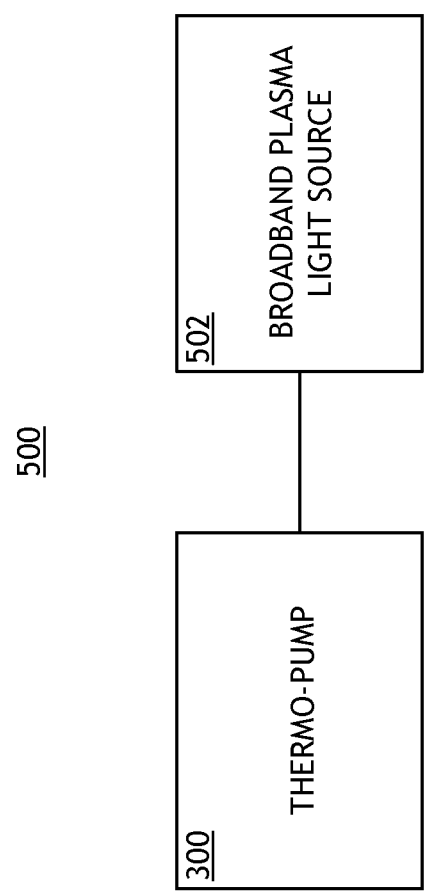
FIG. 5 illustrates a conceptual block diagram view of a system incorporating the thermo-pump, in accordance with one or more embodiments of the present disclosure.

FIG. 5 illustrates a conceptual block diagram view of a system 500 incorporating the thermos-pump, in accordance with one or more embodiments of the present disclosure.

In embodiments, the system 500 includes the thermo-pump 300. The thermo-pump 300 may include one or more gas bearings 100 as disclosed in the present disclosure.

In embodiments, the system 500 includes a broadband plasma (BBP) light source 502. However, it should be noted that the thermo-pump 300 as disclosed herein may be used with any device requiring operation of a thermo-pump 300. The thermo-pump 300 may be configured to provide a pressurized gas to the BBP light source 502. For example, the BBP light source 502 may be configured to operate in part based on high pressure gases. For instance, the BBP light source 502 may require pressurized gases to power a laser within the BBP light source 502. Thus, the thermo-pump 300 may provide such pressurized gas to the BBP light source 502. Such a configuration is disclosed in U.S. Pat.

No. 11,450,521, issued on Sep. 20, 2022, which is incorporated herein by reference in its entirety.

Further, the BBP light source 502 may be used for any use known in the art. For example, the BBP light source 502 may be used for metrology.

Figure 6:
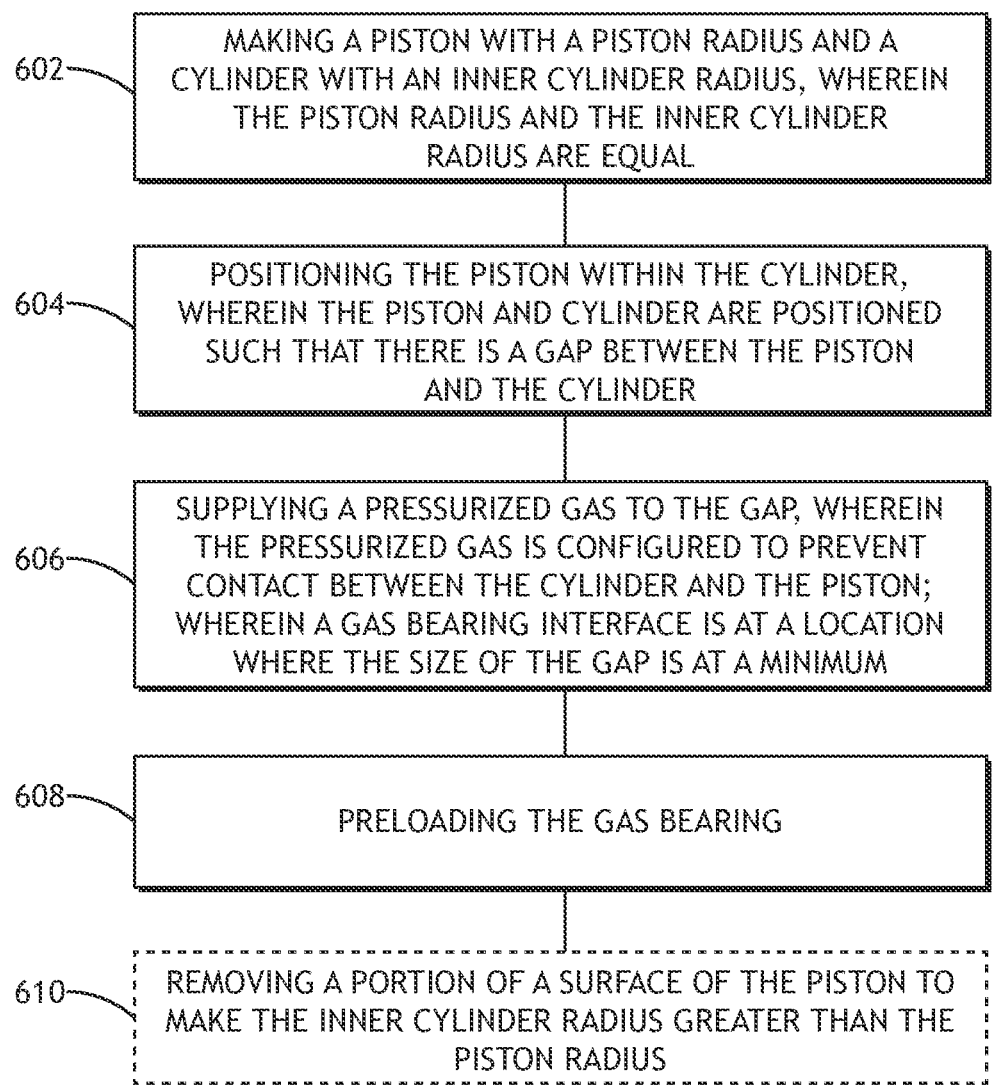
FIG. 6 illustrates a flow diagram depicting a method for manufacturing a gas bearing of use in the thermo-pump, in accordance with one or more embodiments of the present disclosure.

FIG. 6 illustrates a flow diagram depicting a method 600 for manufacturing a gas bearing of use in the thermo-pump, in accordance with one or more embodiments of the present disclosure. Applicant notes that the implementations and enabling technologies described previously herein in the context of the gas bearings 100, the thermo-pump 300, and/or the system 500 should be interpreted to extend to the method 600. It is further noted, however, that the method 600 is not limited to the architecture of the gas bearings 100, the thermo-pump 300, and/or the system 500.

In embodiments, the method 600 includes a step 602 of making a piston with a piston radius and a cylinder with an inner cylinder radius, wherein the piston radius and the inner cylinder radius are equal. For example, the piston and the cylinder may be made from the same material or materials with equal (or approximately equal) thermal expansion coefficients.

In embodiments, the method 600 includes a step 604 of positioning the piston within the cylinder, wherein the piston and cylinder are positioned such that there is a gap between the piston and the cylinder. The gap between the piston and the cylinder may be filled with a pressurized gas. Further, the piston and the cylinder may be positioned concentrically.

In embodiments, the method 600 includes a step 606 of supplying a pressurized gas to the gap, wherein the pressurized gas is configured to prevent contact between the cylinder and the piston; wherein a gas bearing interface is at a location where the size of the gap is at a minimum. For example, the pressurized gas may come from the operation of a thermo-pump.

In embodiments, the method 600 includes a step 608 of preloading the gas bearing. For example, the gas bearing may be preloaded with springs (e.g., as in FIG. 4). By way of another example, the gas bearing may be preloaded using gravity.

In embodiments, the method 600 includes a step 610 of removing a portion of a surface of the piston to make the inner cylinder radius greater than the piston radius. For example, the piston may have a portion of its surface removed so that the piston radius is 0.1 millimeters smaller than the inner cylinder radius.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed is:

1. A gas bearing comprising:
    a cylinder with an inner cylinder radius;
    a piston with a piston radius, wherein the inner cylinder radius is larger than the piston radius, wherein the piston is located within the cylinder;
    a gas bearing radius, wherein the gas bearing radius is greater than the piston radius and less than the inner cylinder radius;
    wherein a gap exists between the cylinder and the piston, wherein the gap contains a pressurized gas, the pressurized gas configured to prevent contact between the cylinder and the piston; and
    a preloaded gas bearing interface to form an asymmetric gap between the cylinder and the piston, wherein the preloaded gas bearing interface is positioned to control a size of the gap,
    wherein the preloaded gas bearing interface is positioned at a predetermined location along a section of the piston where the gap is smallest.

2. The gas bearing of claim 1, wherein the cylinder and the piston are made from a same material.

3. The gas bearing of claim 1, wherein the cylinder and the piston are made from different materials, wherein the different materials have thermal expansion coefficients that are equivalent.

4. The gas bearing of claim 1, wherein the cylinder and the piston are originally manufactured with the inner cylinder radius equal to the piston radius, wherein material is removed from the piston radius to make the inner cylinder radius larger than the piston radius.

5. The gas bearing of claim 1, wherein the gas bearing is preloaded using gravity.

6. The gas bearing of claim 1, wherein the gas bearing is preloaded with one or more springs.

7. The gas bearing of claim 1, wherein the gas bearing is stable in response to temperature gradients.

8. The gas bearing of claim 1, wherein a tolerance in at least one of the inner cylinder radius or the piston radius is at least 5 micrometers.

9. The gas bearing of claim 1, wherein a difference between the inner cylinder radius and the piston radius is less than 0.1 millimeters.

10. A thermo-pump comprising:
    a sealed casing, wherein the sealed casing is divided into a main casing volume and one or more secondary volumes;
    a shaft, wherein the shaft is configured to be driven to cause the shaft to linearly oscillate within the sealed casing;
    a displacer, wherein the displacer is coupled to the shaft and oscillates within the main casing volume based on oscillation of the shaft, wherein oscillation of the displacer creates a pressure gain between a high-pressure phase and a low-pressure phase;
one or more sealing rings, wherein the one or more sealing rings are coupled to the displacer and extend radially outward into the main casing volume, wherein the one or more sealing rings are made from a sealing ring material selected to have at least one of a sealing ring thermal conductivity coefficient or a sealing ring thermal expansion coefficient below a threshold;
an insert, wherein the insert is configured to form a perimeter of the main casing volume, wherein the insert is made from an insert material selected to have at least one of an insert thermal conductivity coefficient or an insert thermal expansion coefficient below the threshold, wherein the one or more sealing rings and the insert direct a gas through the displacer;
one or more bushings, wherein the one or more bushing separate the sealed casing into the main casing volume and the one or more secondary volumes; and
one or more gas bearings configured to prevent contact between the shaft and the sealed casing, wherein the one or more gas bearings are configured to operate based on the high-pressure phase and the low-pressure phase created by pressure oscillations caused by the oscillation of the displacer, wherein the one or more gas bearings comprises:
a cylinder with an inner cylinder radius;
wherein the inner cylinder radius is larger than a radius of the shaft;
a gas bearing radius, wherein the gas bearing radius is greater than the shaft radius and less than the inner cylinder radius;
wherein a gap exists between the cylinder and the shaft, wherein the gap contains a pressurized gas, the pressurized gas configured to prevent contact between the cylinder and the shaft; and
a preloaded gas bearing interface to form an asymmetric gap between the cylinder and the shaft, wherein the preloaded gas bearing interface is positioned to control a size of the gap,
wherein the preloaded gas bearing interface is positioned at a predetermined location along a section of the shaft where the gap is smallest.

11. The thermo-pump of claim 10, wherein the cylinder and the shaft are made from a same material.

12. The thermo-pump of claim 10, wherein the cylinder and the shaft are made from different materials, wherein the different materials have thermal expansion coefficients that are equivalent.

13. The thermo-pump of claim 10, wherein the cylinder and the shaft are originally manufactured with the inner cylinder radius equal to the shaft radius, wherein material is removed from the shaft radius to make the inner cylinder radius larger than the shaft radius.

14. The thermo-pump of claim 10, wherein the gas bearing is preloaded using gravity.

15. The thermo-pump of claim 10, wherein the gas bearing is preloaded with one or more springs.

16. The thermo-pump of claim 10, wherein the gas bearing is stable in response to temperature gradients.

17. The thermo-pump of claim 10, wherein a tolerance in at least one of the inner cylinder radius or the shaft radius is at least 5 micrometers.

18. The thermo-pump of claim 10, wherein a difference between the inner cylinder radius and the shaft radius is less than 0.1 millimeters.

19. A system, comprising:
a broadband plasma light source; and
a thermo-pump the thermo-pump configured to provide pressurized gas to the broadband plasma light source, comprising:
a sealed casing, wherein the sealed casing is divided into a main casing volume and one or more secondary volumes;
a shaft, wherein the shaft is configured to be driven to cause the shaft to linearly oscillate within the sealed casing;
a displacer, wherein the displacer is coupled to the shaft and oscillates within the main casing volume based on oscillation of the shaft, wherein oscillation of the displacer creates a pressure gain between a high-pressure phase and a low-pressure phase;
one or more sealing rings, wherein the one or more sealing rings are coupled to the displacer and extend radially outward into the main casing volume, wherein the one or more sealing rings are made from a sealing ring material selected to have at least one of a sealing ring thermal conductivity coefficient or a sealing ring thermal expansion coefficient below a threshold;
an insert, wherein the insert is configured to form a perimeter of the main casing volume, wherein the insert is made from an insert material selected to have at least one of an insert thermal conductivity coefficient or an insert thermal expansion coefficient below the threshold, wherein the one or more sealing rings and the insert direct a gas through the displacer;
one or more bushings, wherein the one or more bushing separate the sealed casing into the main casing volume and the one or more secondary volumes; and
one or more gas bearings configured to prevent contact between the shaft and the sealed casing, wherein the one or more gas bearings are configured to operate based on the high-pressure phase and the low-pressure phase created by pressure oscillations caused by the oscillation of the displacer, wherein at least one of the one or more gas bearings comprises:
a cylinder with an inner cylinder radius;
wherein the inner cylinder radius is larger than the shaft radius, wherein the shaft is located within the cylinder;
a gas bearing radius, wherein the gas bearing radius is greater than the shaft radius and less than the inner cylinder radius;
wherein a gap exists between the cylinder and the shaft, wherein the gap contains a pressurized gas, the pressurized gas configured to prevent contact between the cylinder and the shaft; and
a preloaded gas bearing interface to form an asymmetric gap between the cylinder and the shaft, wherein the preloaded gas bearing interface is positioned to control a size of the gap,
wherein the preloaded gas bearing interface is positioned at a predetermined location along a section of the shaft where the gap is smallest.

20. The system of claim 19, wherein the cylinder and the shaft are made from a same material.

21. The system of claim 19, wherein the cylinder and the shaft are made from different materials, wherein the different materials have thermal expansion coefficients that are equivalent.

22. The system of claim 19, wherein the cylinder and the shaft are originally manufactured with the inner cylinder radius equal to the shaft radius, wherein material is removed from the shaft radius to make the inner cylinder radius larger than the shaft radius.

23. The system of claim 19, wherein the gas bearing is preloaded using gravity.

24. The system of claim 19, wherein the gas bearing is preloaded with one or more springs.

25. The system of claim 19, wherein the gas bearing is stable in response to temperature gradients.

26. The system of claim 19, wherein a tolerance in at least one of the inner cylinder radius or the shaft radius is at least 5 micrometers.

27. The system of claim 19, wherein a difference between the inner cylinder radius and the shaft radius is less than 0.1 millimeters.

28. A method for manufacturing a gas bearing comprising:
   making a piston with a piston radius and a cylinder with an inner cylinder radius, wherein the piston radius and the inner cylinder radius are equal;
   positioning the piston within the cylinder, wherein the piston and cylinder are positioned such that there is a gap between the piston and the cylinder;
   supplying a pressurized gas to the gap, wherein the pressurized gas is configured to prevent contact between the cylinder and the piston; wherein a preloaded gas bearing interface is at a location to form an asymmetric gap between the cylinder and the piston, wherein the preloaded gas bearing interface is positioned at a pre-determined location along a section of the piston where the gap is smallest; and
   preloading the gas bearing.

29. The method of claim 28, wherein the preloading the gas bearing comprises:
   preloading the gas bearing with gravity.

30. The method of claim 28, wherein the preloading the gas bearing comprises:
   preloading the gas bearing with one or more springs.

31. The method of claim 28 further comprising removing a portion of a surface of the piston to make the inner cylinder radius greater than the piston radius.

* * * * *